US005972239A

United States Patent [19]

[11] Patent Number: 5,972,239

[45] Date of Patent: Oct. 26, 1999

Coyle-Rees

[54] ACIDIC BLEACHING SOLUTION, METHOD OF PREPARATION AND A BLEACHING SYSTEM FOR FORMING THE SAME

[75] Inventor: Margaret Coyle-Rees, Racine, Wis.

[73] Assignee: S. C. Johnson & Son, Inc., Racine, Wis.

[21] Appl. No.: 09/167,574

[22] Filed: Oct. 7, 1998

Related U.S. Application Data

[62] Division of application No. 08/747,491, Nov. 12, 1996, Pat. No. 5,911,909.

[51] Int. Cl.[6] .............................. C01B 11/06; C11D 3/395

[52] U.S. Cl. ................................ 252/187.25; 252/187.24; 252/187.26; 252/186.36; 510/303

[58] Field of Search ......................... 252/187.24, 187.25, 252/187.26, 186.36, 187.27, 187.28, 187.29, 187.3, 186.37, 189; 510/303

[56] References Cited

U.S. PATENT DOCUMENTS

| | | | |
|---|---|---|---|
| 3,328,294 | 6/1967 | Self et al. | 210/62 |
| 3,749,672 | 7/1973 | Golton et al. | 252/95 |
| 4,552,679 | 11/1985 | Schobel et al. | 252/186.31 |
| 4,822,512 | 4/1989 | Auchincloss | 252/106 |
| 4,992,195 | 2/1991 | Dolan et al. | 252/187.25 |
| 5,398,846 | 3/1995 | Corba et al. | 222/1 |
| 5,460,736 | 10/1995 | Trinh et al. | 252/8.8 |
| 5,503,768 | 4/1996 | Tokuoka et al. | 252/189 |
| 5,510,047 | 4/1996 | Gabriel et al. | 252/332 |
| 5,651,996 | 7/1997 | Roozdar | 424/665 |
| 5,767,055 | 6/1998 | Choy et al. | 510/406 |

FOREIGN PATENT DOCUMENTS

| | | |
|---|---|---|
| 932750 | 9/1961 | United Kingdom . |
| 2078522 | 6/1981 | United Kingdom . |
| WO95/08558 | 8/1990 | WIPO . |
| WO97/31095 | 8/1997 | WIPO . |

*Primary Examiner*—Joseph D. Anthony

[57] ABSTRACT

An acidic bleaching solution formed from the admixture of a first aqueous solution containing a chlorine deactivating agent and a second aqueous solution containing a hypochlorite salt is disclosed. Also disclosed is a bleaching system for forming the acidic bleaching solution, as well as a method of preparing the acidic bleaching solution. The acidic bleaching solution advantageously generates little or no chlorine gas while being a particularly effective cleaner for removing soapscum, limescale, mold and mildew from treated surfaces.

15 Claims, No Drawings

ACIDIC BLEACHING SOLUTION, METHOD OF PREPARATION AND A BLEACHING SYSTEM FOR FORMING THE SAME

This application is a division of U.S. patent application Ser. No. 08/747,491, filed Nov. 12, 1996, now U.S. Pat. No. 5,911,909.

BACKGROUND OF THE INVENTION

1. Field of the Invention

This invention relates to an acidic bleaching solution that generates little or no chlorine gas during use and which is particularly effective as a cleaner for removing soapscum, limescale, mold and mildew from treated surfaces. The invention also relates to a bleaching system for forming the acidic bleaching solution and a method of preparing the acidic bleaching solution.

2. Related Background Art

Bleach/sulfamic acid cleaning compositions have long been known. For example, UK Patent Application GB 932,750 discloses a powdered cleansing composition containing alkali metal monopersulfate salts and alkali metal chlorides in combination with a nitrogen-containing chlorine-hypochlorite acceptor such as sulfamic acid. The chlorine generated upon the addition of water to the composition is said to be tied up by the nitrogen-containing chlorine-hypochlorite acceptor so as to reduce or eliminate the expected chlorine odor.

A sanitizing composition which is said to have an improved shelf life in the dry state is described in UK Patent Application GB 2078522. The composition comprises sodium or calcium hypochlorite, an acid source which desirably includes sulfamic acid in combination with another non-reducing acid such as malic acid or succinic acid and a surfactant. The acid content of the composition is said to enhance the ability of the composition to sanitize surfaces with lime scale or milk stone. This composition, however, has been reported to evolve chlorine gas when stored in damp conditions or when prepared in concentrated aqueous solutions.

U.S. Pat. No. 4,822,512 reportedly overcomes this problem through the use of a low level of water-soluble inorganic halide in the composition, such as sodium chloride. In particular, a water-soluble biocidal composition is described as (a) 0.01 to 5 parts by weight of a water-soluble inorganic halide, (b) 25 to 60 parts by weight of an oxidizing agent which, in aqueous solution, reacts with halide to generate hypothalite ions, (c) 3 to 8 parts by weight of sulfamic acid, (d) 0 to 20 parts by weight of an anhydrous non-reducing organic acid such as malic acid or succinic acid and (e) 10 to 30 parts by weight of an anhydrous alkali metal phosphate. The pH of a 1% by weight aqueous solution of this composition is between about 1.2 and 5.5. The aforementioned compositions, however, are directed to dry or powder compositions and thus do not contemplate the problems associated with aqueous liquid bleach solutions.

In particular, it is well known that the addition of an aqueous hypochlorite solution to an acidic cleaning solution will generally result in the evolution of potentially dangerous amounts of chlorine gas. A number of compositions have been proposed in an attempt to overcome this problem. U.S. Pat. No. 3,749,672 is directed to buffered aqueous solutions having a pH between 4 and 11 which are prepared by adding a hypochlorite such as sodium hypochlorite to certain N-hydrogen compounds such as sulfamic acid. In particular, it is said that stable bleaching compositions under acid conditions (e.g. pH of about 4.0 to 6.9) may be obtained when there is an excess of sulfamate (e.g., a mole ratio less than 2:1 of hypochlorite to sulfamate). However, the presence of the excess sulfamate is likely to result in a hypochlorite-sulfamate complex which will decrease the bleaching kinetics or efficiency of the composition.

U.S. Pat. No. 5,503,768 describes a halogen scavanger constituted by an aromatic ring and at least one group which contains a lone-pair-containing hetero atom adjacent to the aromatic ring. The electron donating aromatic compound, i.e., the halogen scavenger, can be added to an acid cleaner which when mixed with an oxidizing agent such as sodium hypochlorite prior to use suppresses the release of halogen gas. It is reported that it is desirable to add the electron donating aromatic compound to the acid cleaner in an approximately equal molar amount to the halogen estimated to be released upon the mixture of the acid cleaner with the oxidizing agent.

There continues, however, to be a need for acidic bleaching compositions that do not result in the substantial generation of potentially hazardous chlorine gas when a hypochlorite solution is mixed with an acidic solution. Such acidic bleaching compositions, i.e., low chlorine gas generation, that have excellent bleaching efficacy are particularly desirable.

SUMMARY OF THE INVENTION

This invention relates to an acidic bleaching solution prepared by the process of mixing (a) a first aqueous solution having a pH of about 6 or less comprising:
   (i) a chlorine deactivating agent; and
   (ii) a non-oxidizable acid; and
(b) a second aqueous solution having a pH of about 10 or greater comprising:
   (i) a hypochlorite salt having 7% by weight or less of residual chloride ion; and
   (ii) optionally a thickening agent, wherein said bleaching solution has a pH of about 6 or less and a molar ratio of hypochlorite ion to said chlorine deactivating agent when said first aqueous solution is mixed with said second aqueous solution is about 3.60 to about 2.5. Exemplary chlorine deactivating agents include sulfamic acid and the salts thereof, isocyanurates, imidosulfonates, carbamates, sulfonamidates and heterocyclic compounds including, for example, glycolurils, hydantoins and succinimides. Other exemplary chlorine deactivating agents include aromatic compounds which have a resonance-effect-relying electron donating group as a constituent. Sulfamic acid and the salts thereof are most preferred.

The acidic bleaching solution of this invention is highly effective for bleaching mold stains on ceramic tiles and like surfaces. The inventive solution may also be employed for bleaching foods, beverages and general soil stains on other hard surfaces such as linoleum, as well as soft surfaces such as laundry and carpets.

Another aspect of this invention is directed to a bleaching system for forming the above-described solution. The system is comprised of a first vessel containing the first aqueous solution and a second vessel containing the second aqueous solution. The first and second vessels can be, for example, either two separate containers or two separate compartments within a single container. The bleaching system is used to form the bleaching solution by mixing an amount of the second solution so that the hypochlorite ion is mixed with the chlorine deactivating agent at a molar ratio of 3.60 to 2.50 to provide a solution having a pH of about 6 or less.

Another aspect of this invention is directed to a method of preparing the acidic bleaching solution of this invention. This method comprises mixing the above-described first aqueous solution and second aqueous solution to form the acid bleaching solution of this invention. This method advantageously results in a highly effective acidic bleaching solution which generates 5 ppm of chlorine gas or less after the solutions are mixed.

DETAILED DESCRIPTION OF THE INVENTION

The acidic bleaching solution of this invention is prepared by the admixture of a first aqueous solution containing a chlorine deactivating agent and a non-oxidizable acid with a second aqueous solution containing a hypochlorite salt and optionally a thickening agent. The pH of the first aqueous solution is about 6 or less, while the pH of the second aqueous solution is about 10 or greater. The pH of the mixture of the two aqueous solutions is about 6 or less. Most preferably the pH of the acidic bleaching solutions is about 4–5. Acidic bleaching solutions having a pH below 4 are generally not preferred because such solutions require an excess of chlorine deactivating agent.

Chlorine deactivating agents are well known. Sulfamic acid and water soluble salts thereof are preferred in the present invention. Such water soluble salts include, for example, sodium, potassium, magnesium, calcium, lithium and aluminum salts of sulfamic acid. Sulfamic acid itself, however, is most preferred.

Other chlorine deactivating agents useful in the present invention include, for example, isocyanuric acid, succinimide, cyanamide, dicyandiamide, melamine, ethyl carbamate, urea, thiourea, 1,3-dimethylbiuret, methyl phenylbiuret, barbituric acid, 6-methyluracil, 2-imidazolinone, iron, 5,5-dimethylhydantoin, ethyleneurea, 2-pyrimidinone, benzamide, phthalimide, N-ethylacetamide, azetidin-2-one, 2-pyrrolidone, caprolactam, sulfamide, p-toluenesulfonamide, phenyl sulfinimide, phenyl sulfinimidylamide, diphenyl sulfonimide, dimethyl sulfinimine, isothiazolene-1,1-dioxide, orthophosphoryl triamide, pyrophosphoryl triamide, phenyl phosphoryl-bis dimethylamide, boric acid amide, methanesulfonamide, melamine, pyrrolidone, hydantoin, acetanilide, acetamide, N-methylurea, acetylurea, biuret, ethyl allophanate, pyrrole and indole.

Additional useful chlorine deactivating agents include the electron-donating aromatic compounds described in U.S. Pat. No. 5,503,768, the disclosure of which is incorporated by reference herein.

Generally, the chlorine deactivating agent is present in the first aqueous solution in an amount between about 0.05% to about 10.0%, preferably between about 0.5% to about 4.0% by weight of the first aqueous solution. However, a critical aspect of this invention is that the chlorine deactivating agent present in the first aqueous solution should be combined with the hypochlorite of second aqueous solution at a molar ratio of hypochlorite to chlorine deactivating agent between about 3.60 and about 2.5, preferably between about 3.40 and about 2.80.

The nonoxidizable acid employed in the first aqueous solution is resistant to oxidation by hypochlorite salts. Typically it is present in amount of up to the buffer capacity of the first aqueous solution. Accordingly, the nonoxidizable acid is generally present in amounts from about 3% to about 15%, most preferably between about 6% to about 10% by weight of the first aqueous solution. Preferred nonoxidizable acids include succinic, adipic and oxalic acids. Other potential nonoxidizable acids include polyphosphates, polycarboxylates and diphosphonates, particularly aliphatic or cyclic diphosphonates, such as etridonic acid (EHDP).

The first aqueous solution may also contain a base to adjust the pH. Generally the pH of the first aqueous solution is adjusted to about 2–6, preferably 4–5 by the addition of a base such as sodium hydroxide, potassium hydroxide, magnesium hydroxide or calcium hydroxide. Since the first aqueous solution acts as a buffer, the ultimate pH of the acidic bleaching solution of this invention will generally approximate the pH of the the first aqueous solution. Other components of the first aqueous solution may include surfactant(s), hydrotrope(s), solvent(s), fragrance(s) and the like.

Surfactant(s) may also be included in the first aqueous solution to enhance the cleaning and/or foaming properties of the acidic bleaching solution of this invention. Such surfactants include, but are not limited to, linear alkyl benzene sulfonates, lauryl sulfates, alcohol ether sulfates and the like. Other surfactants that may be present, but are less preferred, are ethoxylated nonionic surfactants. The amount of surfactant utilized in the first aqueous solution is determined by the surfactant cleaning properties as well as the particular application for which the acidic bleaching solution is formulated. Generally, the surfactant is present in an amount between about 0 to 15% by weight of the first aqueous solution.

Hydrotropes may be employed in the first aqueous solution to assist in blending of solvents and surfactants, if present. Therefore the amount of hydrotrope is dependent upon the concentration of the solvents and surfactant. Generally, the hydrotrope is present in an amount between about 0 to about 8%, preferably about 2% to about 6% and most preferably about 4% by weight of the first aqueous solution. A preferred hydrotrope is sodium xylene sulfonate. Other exemplary hydrotropes include sodium butyl monoglycol sulfate, sodium toluene sulfonate and sodium cumene sulfonate.

Organic solvents may also be present in the first aqueous solution to enhance the cleaning efficiency of the acidic bleaching solution of this invention. Such organic solvents are well known to those of ordinary skill in the art. A preferred solvent is 2-(2-hexyloxy ethoxyl) ethanol available as Hexyl Carbitol® from Union Carbide, Danbury, Conn. Other typical solvents that may be employed in this invention include glycol ethers such as, for example, ethylene glycol monobutyl ether or ethylene glycol monohexyl ether available as Butyl Cellusolve® and Hexyl Cellusolve®, respectively, from Union Carbide, as well as various Dowanol® solvents available from Dow Chemical, Midland, Mich. The solvent is generally present in the first aqueous solution in an amount of about 0 to 10%, more preferably about 3% to 7% by weight of the first aqueous solution.

The hypochlorite salts employed in the present invention include, for example, potassium hypochlorite, sodium hypochlorite, lithium hypochlorite and the like. Sodium hypochlorite is most preferred. A critical aspect of this invention is that the hypochlorite salt must have 7% or less residual chloride ion content, most preferably less than 1.0% by weight of the hypochlorite salt. Sodium hypochlorite having such a low residual chloride ion content is available from Olin Corporation, Charleston, Tenn. under the tradename "Hypure".

Generally the hypochlorite salt is present in an amount between about 0.5% to about 12%, preferably about 1.0% to about 5% by weight of the second aqueous solution. Again, the amount of hypochlorite salt will depend upon the amount of chlorine deactivating agent present in the first aqueous solution and the mixing ratio of the two aqueous solutions, as well as the desired bleaching efficiency of the resulting acidic bleaching solution.

The second aqueous solution also preferably contains a thickening agent. Polyacrylate thickeners are preferred, although any thickener may be employed which is not deleteriously affected by the hypochlorite salt. Generally the thickening agent is present in the second aqueous solution in an amount from about 0 to about 5%, preferably from about 1% to about 3% by weight of the second aqueous solution.

For the best stability and most efficient bleaching efficacy the acidic bleaching solution is prepared just prior to use by admixture of the first aqueous solution and the second aqueous solution. Accordingly, another aspect of this invention is directed to a bleaching system for conveniently forming the acidic bleaching solution of this invention just prior to use.

The preferred bleaching system of this invention is comprised of two vessels. The first vessel contains the first aqueous solution and a second vessel contains the second aqueous solution. The concentration of the components in the first and second solutions is selected so that when a given amount of the first aqueous solution is mixed with a given amount of the second aqueous solution the above-described acidic bleaching solution is obtained. Thus, the concentrations of the components in the first aqueous solution and the second aqueous solution will be dependent upon the ratio of the mixture of the two solutions. Once it is decided what fixed amount of the first aqueous solution is to be combined with a fixed amount of the second solution, then the determination of the amounts of each component in each solution, particularly the amounts of hypochlorite salt and chlorine deactivating agent, is a simple arithmetic calculation, i.e., a routine calculation to those having ordinary skill in the art.

The vessels employed in the bleaching system of this invention can each be separate containers or can be a single container having two compartments. For instance, a single container having two compartments or vessels holding the first aqueous and second aqueous solutions and having a pump line inserted into each compartment and merging at a single pump spray mechanism may be employed. On the other hand, the bleaching systems of this invention can simply consist of two separate containers holding the first aqueous and second aqueous solutions which can be mixed by adding a predetermined amount of one solution to a predetermined amount of the other. Other delivery mechanisms which provide a means for mixing the components of the bleaching solution of this invention are also contemplated. Exemplary containers for use with the bleaching system of this invention are disclosed in U.S. Pat. No. 5,398,846 entitled "Assembly for Simultaneous Dispensing of Multiple Fluids", the disclosure of which is incorporated by reference as if fully set forth herein.

The present invention is also directed to the method of preparing the acidic bleaching solution of this invention. The method comprises the step of combining the previously described first aqueous and second aqueous solutions so that the ratio of the hypochlorite ion added to the chlorine deactivating agent is between about 3.60 and 2.5, preferably about 3.40 to about 2.80 and the resulting acidic bleach solution has a pH of 6 or less, most preferably 5 to 4.

The examples which follow are intended as an illustration of certain preferred embodiments of the invention, and no limitation of the invention is implied.

EXAMPLE 1

A first aqueous solution was prepared having the following components:

| Components | % w/w |
|---|---|
| Deionized Water | 72.2 |
| NaOH | 2.20 |
| Hexyl Carbitol[1] | 5.00 |
| Sodium Xylene Sulfonate | 4.00 |
| Succinic Acid | 7.00 |
| Sulfamic Acid | 1.00 |
| Fragrance | 0.60 |
| Calsoft L-60 (58% actives)[2] | 5.00 |
| Calfoam ES-603 (59% actives)[3] | 3.00 |

[1]2-(2-Hexyloxy ethoxyl) ethanol available from Union Carbide, Danbury, Connecticut
[2]Sodium dodecylbenzene sulfonate; available from Pilot Chemical, Red Bank, New Jersey.
[3]Sodium lauryl ether sulfate; available from Pilot Chemical, Red Bank, New Jersey.

The resulting first aqueous solution had a pH of about 4.2.

A second aqueous solution was prepared having the following components:

| Components | % w/w |
|---|---|
| Deionized Water | 89.5 |
| Sokalan PA 50 (40% actives, pH 7)[1] | 2.0 |
| Sodium Hypochlorite, low salt, 20%[2] | 8.5 |

[1]A polyacrylate thickener; available from BASF, Parsippany, New Jersey.
[2]Hypure N (0.53% chloride ion content) available from Olin Corp., Charleston, Tennessee.

The resulting second aqueous solution had a pH of about 12.

An acidic bleaching solution was prepared by placing the first aqueous solution (the cleaning solution) and the second aqueous solution (the bleaching solution) in separate chambers of a dual chambered bottle. The bleaching solution and cleaning solution were codispensed at an equal rate and sprayed into an enclosed 10 inch (25.4 cm)×10 inch (25.4 cm)×16 inch (40.6 cm) plexi-glass box. The combined solution had a pH of 4.17. No chlorine gas was detected by measurement with a Matheson-Kitagawa Gas Analyzer, Model #8014-400A and Matheson-Kitagawa Precision Gas Detector Tubes (Tube #1092b, Chlorine, 0.1–10 ppm) over a time interval of 15–20 minutes after application of the acidic bleaching solution.

Bleaching Efficacy:

The acidic aqueous solutions of this invention were assessed for the ability to bleach common mold and mildew found on shower tiles in a typical bathroom. White, 4 inch (10.2 cm)×4 inch (10.2 cm), ceramic tiles were used. These tiles were quartered, washed and dried prior to inoculation with *A. niger* in Czappek Dox Broth. The tiles were placed in humidity chambers that were equilibrated with a saturated solution of sodium phosphate to maintain a humidity of 80–95% and incubated at 28° C. for 7 to 21 days until a desired amount of mold growth was obtained.

The bleaching solution to be tested was then applied to the tile by spray from a dual chambered bottle. Subtantially equivalent amounts of bleaching solution were applied to separate tiles and the tile was allowed to stand for specified time period (5–25 minutes). After the specified time interval, each tile was assessed for whiteness and rated on a scale of 0 to 4 (0—no bleaching; 1—25% bleaching; 2—50% bleaching; 3—75% bleaching; 4—100% bleaching). The results of the bleach efficacy test are set forth in Table 1, infra.

COMPARATIVE EXAMPLE 1

An acidic aqueous bleaching solution was prepared in a manner similar to Example 1, with the exception that the first aqueous solution did not contain sulfamic acid. Approximately 40 ppm of chlorine gas was detected upon mixing the first aqueous solution with the second aqueous solution.

EXAMPLES 2–4 AND COMPARATIVE EXAMPLES 2–8

The effect of changing the hypochlorite/sulfamic acid ratio (B/SA) at a constant pH was studied by preparing first aqueous solutions in the manner described in Example 1, but varying the concentration of sulfamic acid and sodium hydroxide. The sodium hydroxide was varied to adjust the first aqueous solution to a pH of about 4.2.

The concentration of the sulfamic acid and ratio of hypochlorite ion to sulfamic acid (on both a weight/weight basis and a molar basis) for each formulation (including Example 1), as well as the chlorine gas generation data and the bleach efficacy (Bleach Eff.) are set forth in Table 1 below.

TABLE 1

| Formulation | % SA | B/SA (% w/w) | pH | $Cl_2$ (ppm) | B/SA (molar) | Bleach Eff. |
|---|---|---|---|---|---|---|
| Compar. 2 | 0.5 | 3.4 | ~4.2 | 15 | 6.43 | 4 |
| Compar. 3 | 0.6 | 2.83 | ~4.2 | 15 | 5.35 | 3 |
| Compar. 4 | 0.67 | 2.54 | ~4.2 | 10 | 4.80 | 4 |
| Compar. 5 | 0.7 | 2.43 | ~4.2 | 10 | 4.59 | 2 |
| Compar. 6 | 0.75 | 2.27 | ~4.2 | 5 | 4.29 | 2 |
| Compar. 7 | 0.8 | 2.13 | ~4.2 | 10 | 4.03 | 2 |
| Compar. 8 | 0.85 | 2 | ~4.2 | 10 | 3.78 | 2 |
| Example 2 | 0.9 | 1.9 | ~4.2 | 5 | 3.59 | 2 |
| Example 3 | 0.95 | 1.8 | ~4.2 | 1 | 3.40 | 2 |
| Example 1 | 1.0 | 1.7 | ~4.2 | 0 | 3.21 | 2 |
| Example 4 | 1.1 | 1.55 | ~4.2 | 0 | 2.93 | 2 |

B = OCl formula weight.
SA = Sulfamic acid formula weight

Other variations and modifications of this invention will be obvious to those skilled in the art.

What is claimed is:

1. A bleaching system for forming an acidic bleaching solution comprising (a) a first vessel containing a first aqueous solution having a pH of about 6 or less comprising:

(i) a chlorine deactivating agent; and (ii) a non-oxidizable acid; and (b) a second vessel containing a second aqueous solution having a pH of about 10 or greater comprising:

(i) a hypochlorite salt having 7% by weight or less of residual chloride ion; and (ii) a thickening agent, wherein said bleaching system require when said first aqueous solution and said second aqueous solution are admixed from said first vessel and said second vessel, respectively, said admixture has a molar ratio of hypochlorite ion to chlorine deactivating agent of about 3.6:1 to about 2.5:1 and said admixture has a pH of about 6 or less.

2. A bleaching system according to claim 1, wherein said first vessel and said second vessel are united in a single container.

3. A bleaching system according to claim 1, wherein said chlorine deactivating agent is sulfamic acid or a salt thereof.

4. A bleaching system according to claim 3, wherein said non-oxidizable acid is selected from the group consisting of succinic acid, adipic acid and oxalic acid.

5. A bleaching system according to claim 4, wherein said residual chloride ion content of said hypochlorite salt is less than 1.0% by weight of said hypochlorite salt.

6. A bleaching system according to claim 5, wherein said second aqueous solution comprises a polyacrylate thickening agent.

7. A bleaching system according to claim 6, wherein said molar ratio of hypochlorite ion capable of admixture with said sulfamic acid or salt thereof is about 3.4:1 to about 2.8:1.

8. A bleaching system according to claim 7, wherein the pH of said acidic bleaching solution is about 4 to about 5.

9. A method for preparing an acidic bleaching solution comprising the step of combining (a) a first aqueous solution having a pH of about 6 or less comprising:

(i) a chlorine deactivating agent; and (ii) a non-oxidizable acid; and (b) a second aqueous solution having a pH of about 10 or greater comprising:

(i) a hypochlorite salt having 7% by weight or less of residual chloride ion; and (ii) a thickening agent, wherein said acidic bleaching solution has a pH of about 6 or less and a molar ratio of hypochlorite ion mixed with said chlorine deactivating agent is about 3.6:1 to about 2.5:1.

10. A method according to claim 9, wherein said chlorine deactivating agent is sulfamic acid or a salt thereof.

11. A method according to claim 10, wherein said non-oxidizable acid is selected from the group consisting of succinic acid, adipic acid and oxalic acid.

12. A method according to claim 11, where said residual chloride ion content of said of said hypochlorite salt is less than 1.0% by weight of said hypochlorite salt.

13. A method according to claim 12, wherein said second aqueous solution comprises a polyacrylate thickening agent.

14. A method according to claim 13, wherein said molar ratio of hypochlorite ion mixed with said sulfamic acid or salt thereof is about 3.4:1 to about 2.8:1.

15. A method according to claim 14, wherein the pH of said acidic bleaching solution is about 4 to about 5.

* * * * *

UNITED STATES PATENT AND TRADEMARK OFFICE

CERTIFICATE OF CORRECTION

Patent No. : 5,972,239

Dated : Oct. 26, 1999

Inventor : Margaret Coyle-Rees

It is certified that errors appear in the above-identified patent and that said Letters Patent is hereby corrected as shown below:

In Claims:

Claim 12, line 2, please delete the second occurrence of "of said".

Signed and Sealed this

Tenth Day of April, 2001

Attest:

Nicholas P. Godici

NICHOLAS P. GODICI

*Attesting Officer* *Acting Director of the United States Patent and Trademark Office*